Sept. 1, 1970  L. GYUGYI ET AL  3,526,789

PULSE PRODUCING SYSTEM

Filed Nov. 29, 1967  3 Sheets-Sheet 1

WITNESSES:
Bernard R. Giegner
James F. Young

INVENTORS
Laszlo Gyugyi, Brian R. Pelly
and John Rosa.
BY Clement J. Paznokas
ATTORNEY

United States Patent Office 3,526,789
Patented Sept. 1, 1970

3,526,789
PULSE PRODUCING SYSTEM
Laszlo Gyugyi, Penn Hills, Brian R. Pelly, Murrysville, and John Rosa, Penn Hills, Pa., assignors to Westinghouse Electric Corporation, Pittsburgh, Pa., a corporation of Pennsylvania
Filed Nov. 29, 1967, Ser. No. 686,407
Int. Cl. H03k 1/12
U.S. Cl. 307—262
19 Claims

ABSTRACT OF THE DISCLOSURE

Apparatus for supplying firing pulses successively to a number $n$ of controllable electric valves in a cyclic predetermined sequence. The apparatus includes a detector for producing successive control pulses at the successive points in time at which $n$ phased apart timing waves from $n$ sources intersect a control signal. An $n$-stage ring counter responsive to the control pulses from the detector sequentially connects the $n$ timing wave sources to the crossover detector one at a time without overlap, and provides firing pulses for the valves in the aforementioned predetermined sequential order. The ring counter acts to connect each timing wave to the crossover detector only during the necessary crossover sampling period of each respective timing wave.

BACKGROUND OF THE INVENTION

The present invention finds particular utility with single phase full wave or polyphase rectifier circuits wherein firing pulses are applied to controlled rectifiers, for example, thyristors, in timed sequence. These firing pulses should be accurately displaced in phase with respect to one another; and it is usually necessary to shift their phase over a range of around 180° in response to a low level direct current control voltage. It is also frequently required, or at least desirable, to prolong the gate firing signal for the entire duration of the desired conduction period of a given thyristor rather than deliver a properly timed short pulse.

In most cases, the firing angle for each firing pulse is determined by the point in time at which an associated sinusoidal timing wave intersects the aforesaid direct current control voltage. In the usual prior art circuitry for a three phase rectifier, for example, the arrangement consists essentially of three separate crossover detector circuits which operate independently in sequence at 120° intervals. The difficulty with this method, however, is that the three crossover detectors must be well matched to one another in order to insure good tracking of the output pulses. Usually, this is achieved by using certain selected components, as well as by final manual adjustments to preset controls. Another difficulty with drive systems utilizing three separate crossover detectors is that each individual detector which is just called upon to deliver a pulse, does not forward intelligence to the circuit previously delivering a pulse with the purpose of terminating the previous pulse at the proper instant. Therefore in order to avoid overlap and for some other practical considerations, the pulses are simply kept short; whereas it is desired to prolong these pulses for the entire duration of the conduction periods of their associated thyristors.

SUMMARY OF THE INVENTION

As an overall object, the present invention provides drive circuitry for producing firing pulses for controllable electric valves that are to be fired or gated in a cyclic sequence, which circuitry is greatly simplified and overcomes the aforesaid disadvantages of prior art drive circuits.

Another object of the invention is to provide drive circuitry of the type described which utilizes a single (i.e., only one) crossover detector and wherein the timing wave from only one of a plurality of timing or wave sources is sampled at a given time, the sampling of a given wave stopping once it has crossed a control signal, after which instant, sampling of the timing wave next in sequence from a different timing wave source occurs.

Another object of the invention is to provide drive circuitry for applying firing pulses in cyclic sequence to a plurality of controllable electric valves utilizing an $n$-stage ring counter to perform two functions simultaneously in response to each change of state, the first function being to switch the appropriate one of $n$ timing wave sources to the input of a single crossover detector, and the second function being to deliver the drive pulses to the appropriate one of $n$ controllable valves.

A further object of the invention is to provide electrical apparatus wherein the sequential changes of state of an $n$-state ring counter are timed or phased in response to the intersection of a control signal and the particular polarity-going portions of phased apart timing waves from $n$ sources, the timing wave sources being sequentially sampled by a single crossover detector having a control signal applied thereto, the time of each intersection being a function of the level of the control signal which may be constant or variable as desired.

In accordance with one embodiment of the invention, apparatus is provided for generating output pulses of the same particular frequency on each of $n$ number of lines, the pulses on the respective lines being phase displaced from each other in a particular sequence, with the leading edge of each pulse corresponding with the point of intersection of an associated timing wave with a control signal, the apparatus comprising: $n$ number of sources of timing waves having particular polarity going portions recurring at a particular frequency, the waves of the respective sources being phase displaced from each other; a crossover detector, which when a wave having said particular polarity going portion is applied thereto, provides a control pulse when the wave while going in said particular polarity direction crosses a control signal, whereby in response to the application of such a control signal and of a succession of such waves, the detector provides a corresponding succession of control pulses; an $n$-state ring counter which in response to the successive control pulses succesively changes states; circuits responsive to the successive changes of state for successively connecting the timing wave sources one at a time (without overlap) to the detector in a cyclic sequence; and circuits responsive to the successive changes of state for providing output pulses successively on the output lines in a cyclic sequence.

The level of the control signal may be constant or variable as desired. If the control signal is variable, the phase positions of the control pulses relative to said timing waves will be variable. Sampling of any one wave stops once it has crossed the control signal, after which sampling of the timing wave next in sequence starts. This sequential sampling of the timing waves is accomplished by the aforesaid ring counter and, of course, enables the use of one rather than three crossover detectors.

By way of example, the crossover detector comprises a transistor having applied to its base the aforesaid control voltage and a timing wave. Connected to the output of the transistor is a differentiator which produces spiked pulses of one polarity when the transistor conducts and spiked pulses of the opposite polarity when the transistor cuts off. As will be seen, the transistor will be turned on only when a particular polarity-going portion of the timing wave intersects the control signal notwithstanding the fact that the opposite polarity going portion of the timing wave may also intersect the control signal to cut the transistor off.

The above and other objects and features of the invention will become apparent from the following detailed description taken in connection with the accompanying drawings which form a part of this specification and, in which.

Figure 1:
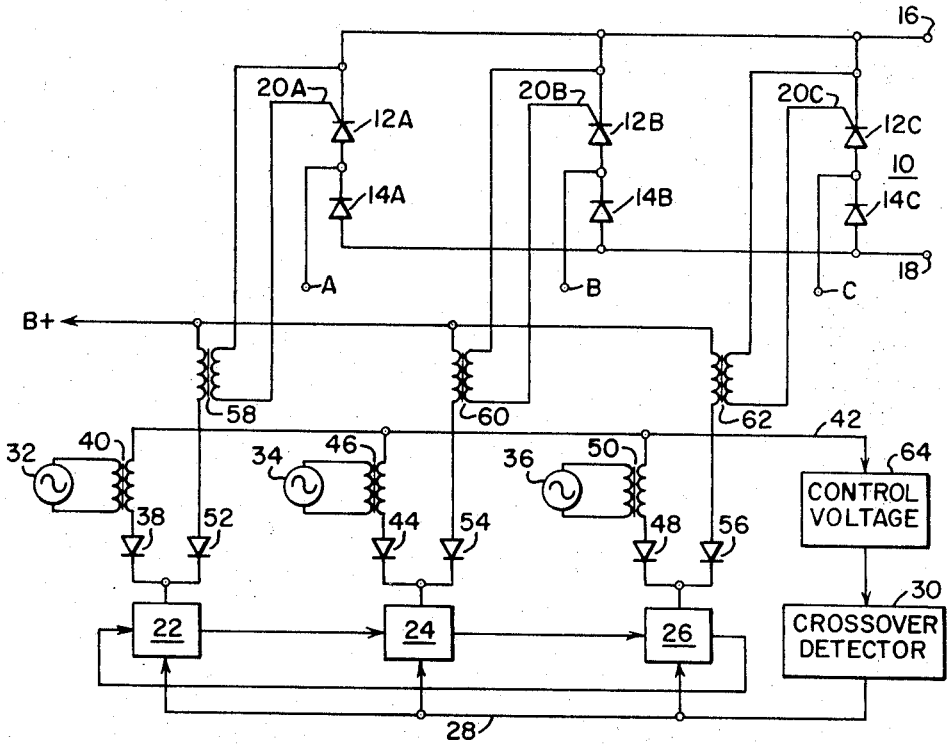
FIG. 1 is a block and schematic circuit diagram of a three-phase controlled rectifier circuit together with the drive circuitry of the present invention for producing firing pulses for the thyristors utilized in the controlled rectifier.

With reference now to the drawings, and particularly to FIG. 1, a three-phase alternating current to direct current converter (i.e., rectifier) is shown and identified generally by the reference numeral 10. In this particular case, the converter includes three controllable electric values 12A, 12B and 12C, for example solid state controlled rectifiers, and three noncontrolled rectifiers 14A, 14B and 14C. The rectifiers are included in three current paths connected between output terminals 16 and 18; while the three current paths are connected, at the junctions of the rectifiers therein, to the three phases or leads A, B and C of a three-phase alternating current supply, not shown.

As will be understood, the solid state controlled rectifiers 12A, 12B and 12C are similar in operation to thyratrons. That is, they are normally non-conducting; however they may be triggered into conduction by application of positive firing pulses to their gate electrodes 20A, 20B or 20C. Once the controlled rectifiers are triggered into conduction, the gate loses control and the rectifiers can be turned off only by reducing the current they carry to zero by some external means. In the converter, reduction in current to zero and turn-off of the rectifiers occur due to the sinusodial nature of the applied voltage. By varying the phases of the positive firing pulses applied to the gate electrodes 20A, 20B and 20C, the periods of conduction of the controlled rectifiers and, hence, the power supplied at output terminals 16 and 18 can be varied. In the circuit of FIG. 1, the controlled rectifiers 12A, 12B and 12C are to be fired 120° apart in a cyclic sequence, for example, in the order of 12A–12B–12C, the frequency of the sequence being related to the frequency of the AC on terminals A, B and C.

The circuitry of the present invention for supplying firing pulses to the gate electrodes 20A, 20B and 20C includes a ring counter having three stages 22, 24 and 26, only one of which can be in the ON state at any one time, the remaining stages being OFF. The ring counter may take many forms; one form being described in detail hereinafter. However, in general, any ring counter is such that if stage 22, for example, is ON application of a clock pulse to all stages via lead 28 will switch stage 22 OFF while simultaneously switching stage 24 ON. Similarly, the next clock pulse will switch stage 24 OFF and switch 26 ON; the next clock pulse will switch stage 26 OFF and stage 22 ON, and so on. Thus the ring counter has three stable states.

The clock pulses for the ring counter on lead 28 are produced by a single crossover detector 30 capable of having applied thereto in sequence any one of three sinusoidal timing waves from sources 32, 34 and 36; although it will be appreciated that a sawtooth or other similar waveform could be substituted if desired. Each of the sources 32, 34 and 36 produces cyclic timing waves of the same frequency as the AC on supply lines A, B and C. The output waves of the sources 32, 34 and 36 are 120° apart in that order. The ring counter stage 22, for example, is connected through diode 38 and the secondary winding of a coupling transformer 40 to a common lead 42 connected to the input of the crossover detector 30. Similarly, stage 24 is connected through diode 44 and coupling transformer 46 to lead 42; while stage 26 is connected to lead 42 through diode 48 and coupling transformer 50. The outputs of the stages 22–26 are also connected through diodes 52, 54 and 56 to the inputs of pulse transformers 58, 60 and 62, respectively, the secondaries of these pulse transformers being connected between the gate electrodes and cathodes of each of the valves 12A–12C.

Inserted in the lead 42 is a source 64 of control voltage whose level determines the point at which the crossover detector 30 will be actuated to produce a clock pulse on lead 28. As will be seen, the crossover detector 30 by way of example is essentially a transistor switch having a differentiator connected to its output. When a sinusoidal timing wave is impressed on the control voltage source, the crossover detector will be actuated to switch ON and then OFF as the sinusoidal waveform intersects the voltage level established by source 64. When the crossover detector switches ON, it delivers a clock pulse on lead 28. By varying the magnitude of the control voltage, the phase of the clock pulses on lead 28 can be varied. It should be understood that under steady state conditions, that is with the control voltage 64 at a constant level or value, the clock pulses on line 28 will be equally spaced. However, transiently or deliberately prolonged if desired, while the level of the control voltage 64 is changing, so that intersections of successive timing waves occur at different levels of the control voltage, the clock pulses on line 28 will not be equally spaced.

If it is assumed, for example, that stage 22 has just been switched ON, a pulse will be produced across transformer 58 with the leading edge of the pulse coinciding with the clock pulse on lead 28. Furthermore, when stage 22 switches ON, the sinusoidal waveform from source 32 will be impressed on the crossover detector 30. The condition will persist until the sinusoidal waveform intersects the control voltage level established by source 64, whereupon the crossover detector 30 will switch and a succeeding clock pulse will be produced on lead 28. Stage 22 now switches OFF and stage 24 switches ON. In this process, the trailing edge of the pulse across transformer 58 is produced and the leading edge of a pulse across transformer 60 is produced. At the same time, the sinusoidal waveform from source 34, which lags that from source 32 by 120°, is now impressed on the crossover detector 30. Again, stage 24 will persist in the ON condition until the waveform from source 34 intersects the voltage level established by source 64, whereupon a succeeding clock pulse will be generated on lead 28 and stage 26 will be switched ON to initiate a pulse on transformer 62 while the pulse produced across transformer 60 terminates.

Figure 2:
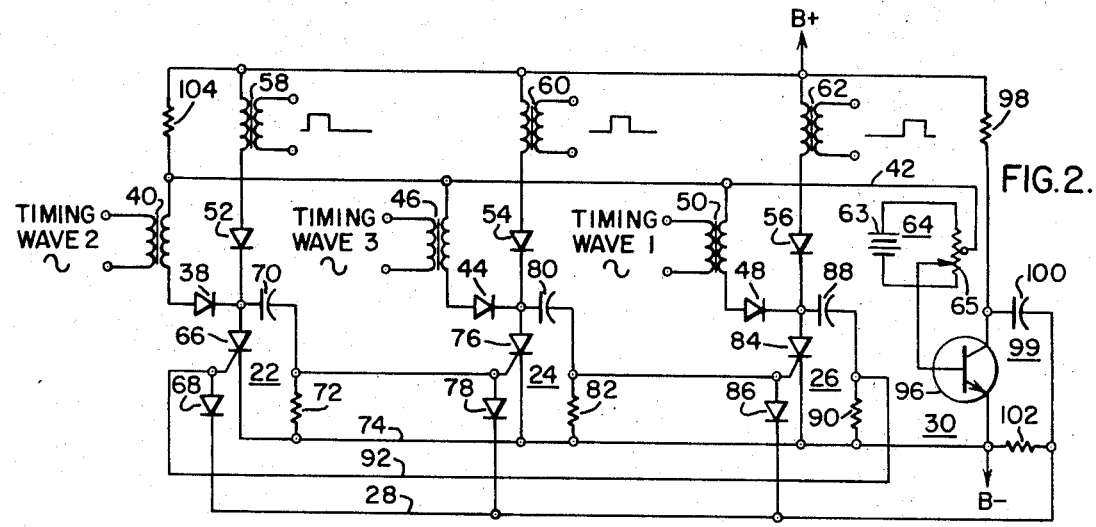
FIG. 2 is a detailed schematic circuit diagram showing one specific type of ring counter which may be utilized in accordance with the invention.

One type of ring circuit configuration for accomplishing the foregoing is shown in FIG. 2 where elements corresponding to those of FIG. 1 are identified by like reference numerals. It should be understood, of course, that the specific ring counter shown in FIG. 2 is only one of many types which can be employed in accordance with the teachings of the invention. Ring counter stage 22, for example, includes a gate controlled switch 66 having its gate electrode connected through diode 68 to the lead 28 on which the clock pulses are impressed. The anode of the gate controlled switch 66 is connected to the cathodes of diodes 38 and 52, and is also connected through capacitor 70 and resistor 72 to a common lead 74 which is connected to a source of negative potential identified as B—.

The junction of resistor 72 and capacitor 70, in turn, is connected to the gate electrode of gate controlled switch 76 in stage 24, the arrangement being such that when switch 66 is turned OFF in response to a clock pulse on lead 28, the voltage on its anode increases, and this increase in voltage is applied to the gate of switch 76 to turn it ON. The gate electrode of switch 76 is also connected to lead 28 through a diode 78; and its anode is connected through capacitor 80 and resistor 82 to lead 74. When switch 76 is gated OFF, the rise in its anode voltage is applied to the gate of switch 84 in stage 26, whereupon switch 84 conducts. The gate electrode of switch 84 is connected to lead 28 through diode 86; and its anode is connected through capacitor 88 and resistor 90 to the lead 74. The junction of elements 88 and 90 is connected through lead 92 to the gate electrode of the switch 66 in stage 22 to complete the ring counter configuration.

The secondary windings of transformers 40, 46 and 50 are all connected through the lead 42 to one terminal of the control voltage source 64, which in FIG. 2 is shown by way of example as a variable voltage source formed by a battery 63 with a center-tapped variable potentiometer 65 thereacross to provide either polarity of DC voltage. The other terminal of the control voltage source 64 is connected to the base of an NPN transistor 96 in the crossover detector 30. The emitter of transistor 96 is connected to the B— voltage source as shown; while its collector is connected through resistor 98 to a source of positive voltage identified as B+, this source of positive voltage also being connected to one end of the primary windings on transformers 58–62. In shunt with the transistor 96 is a differentiator 99 comprising a capacitor 100 and resistor 102 in series, the junction between capacitor 100 and resistor 102 being connected to the lead 28 on which the aforesaid clock pulses appear.

When one of the switches 66, 76 or 84 is ON, the positive direct current supply voltage is impressed across its associated drive output transformer 58, 60 or 62. When it is OFF, there is no voltage across its drive output transformer, and no drive output occurs. As was explained above, at each successive clock pulse, the ring counter changes state, i.e., the switch which is already ON is turned OFF, and the next switch is turned ON. At the same time, the newly conducting switch connects the next appropriate timing waveform to the input of the crossover detector 30. This state of affairs remains until the timing waveform intersects the direct current control voltage provided by source 64, at which point the next clock pulse is produced and the sequence is repeated. The resistor 104 insures a net forward current flow through diodes 38, 44 and 48 when the gate controlled switches 66, 76 and 84, respectively, are ON regardless of the polarity of the timing voltage.

Figure 3A:
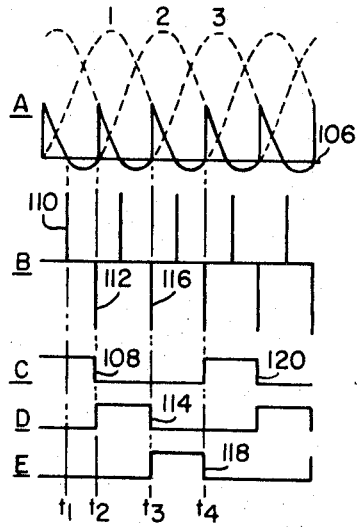
FIGS. 3A, 3B and 3C illustrate waveforms appearing at various point in the circuit of FIG. 2 for various control voltage levels.
Figure 3B:
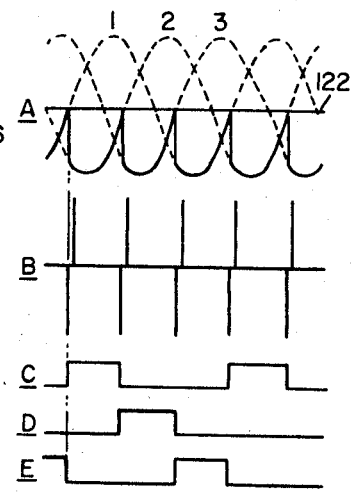
Figure 3C:
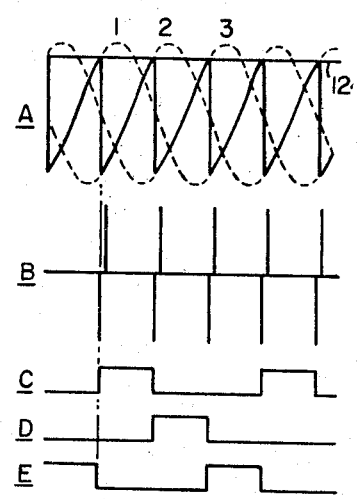

The operation of the circuit of FIG. 2 may best be understood by reference to FIGS. 3A, 3B and 3C which illustrate the conditions existing for various control voltage levels. In FIG. 3A the control voltage assumes the level identified by the line 106. The three sinusoidal timing waves are identified as 1, 2 and 3. Waveform B illustrates the clock pulses produced on lead 28; while waveforms C, D and E represent the drive pulse waveforms appearing across transformers 58, 60 and 62, respectively.

For the condition given in FIG. 3A, the control voltage level is relatively low and positive with respect to the base of transistor 96. At time $t_1$ when the timing waveform 2 crosses the voltage level 106 in the negative-going direction, switch 66 is conducting, and produces a drive pulse 108 across transformer 58. At time $t_1$, the voltage on the base of transistor 96 is also lowered to the point where it cuts off, whereupon the voltage on its collector increases and produces a positive spiked pulse 110 across resistor 102. This positive pulse, however, has no effect on the ring counter. At time $t_2$, waveform 2 again crosses the voltage level 106, but this time the waveform is positive-going. Accordingly, the transistor 96 is turned ON; the voltage on its collector decreases; and a negative spiker pulse 112 is produced across resistor 102 and on lead 28. This negative pulse causes the ring counter to change state by cutting OFF the gate controlled switch 66 which, in turn, turns ON switch 76. Consequently, at time $t_2$, a pulse 114 in waveform D is initiated and appears across transformer 60.

This condition will persist until time $t_3$ is reached where timing waveform 3 crosses the voltage level 106 in a positive-going direction to produce negative spiked pulse 116. This pulse again changes the state of the ring counter by turning OFF gate controlled switch 76 of FIG. 2 and turning ON switch 84, whereupon pulse 118 in waveform E is initiated and appears across output transformer 62. At time $t_4$, waveform 1 crosses voltage level 106 in a positive-going direction, whereupon the state of the counter is again changed by cutting OFF gate controlled switch 84 and turning ON switch 66, thus initiating a pulse 120 in waveform C across output transformer 58. This completes one cycle of operation.

Note that whenever a timing waveform intersects the voltage level 106 in the positive-going direction as at time $t_4$, for example, the timing wave voltage on line 42 changes abruptly from the instantaneous voltage of waveform 1 to the instantaneous voltage of waveform 2. From this point on, waveform 2 is sampled by the crossover detector until it again crosses the voltage level 106 in the positive-going direction, whereupon the waveform changes abruptly to the instantaneous voltage level of timing waveform 3, and so on.

In FIG. 3B, the operation of the circuit is the same except that the control voltage has now changed to the level 122. This has the effect of shifting the phase of the drive pulses as shown by waveforms C, D and E. Finally, in FIG. 3C, the level of the control voltage, which is now negative with respect to the base of transistor 96, has been increased further to that indicated by the line 124, whereupon the pulses in waveforms C, D and E have been shifted still further in phase. In FIGS. 3B and 3C the transistor 96 is turned on momentarily only. Consequently, the positive spiked pulses in waveform B immediately follow the negative spiked pulses which occur during turn-on.

The circuit of FIG. 2 thus provides three output drive signals spaced at 120° intervals if the control voltage is steady. The phase of the output drive pulses can be shifted through a full 180°, suitable for the control of the thyristors in the converter shown in FIG. 1, for example. However, in the case where there are six thyristors in the converter rather than the three shown in FIG. 1, six drive output signals spaced at 60° intervals are required. In this case, two circuits of the type shown in FIG. 2 can be used such that each circuit will produce three drive signals at 120°, the signals produced by the two circuits being displaced by 60° with respect to one another. This, of course, would be accomplished by suitable phase relationships of the input sinusoidal timing waves. Such an arrangement, of course, would require two crossover detectors, one for each three-stage ring counters.

Figure 4:
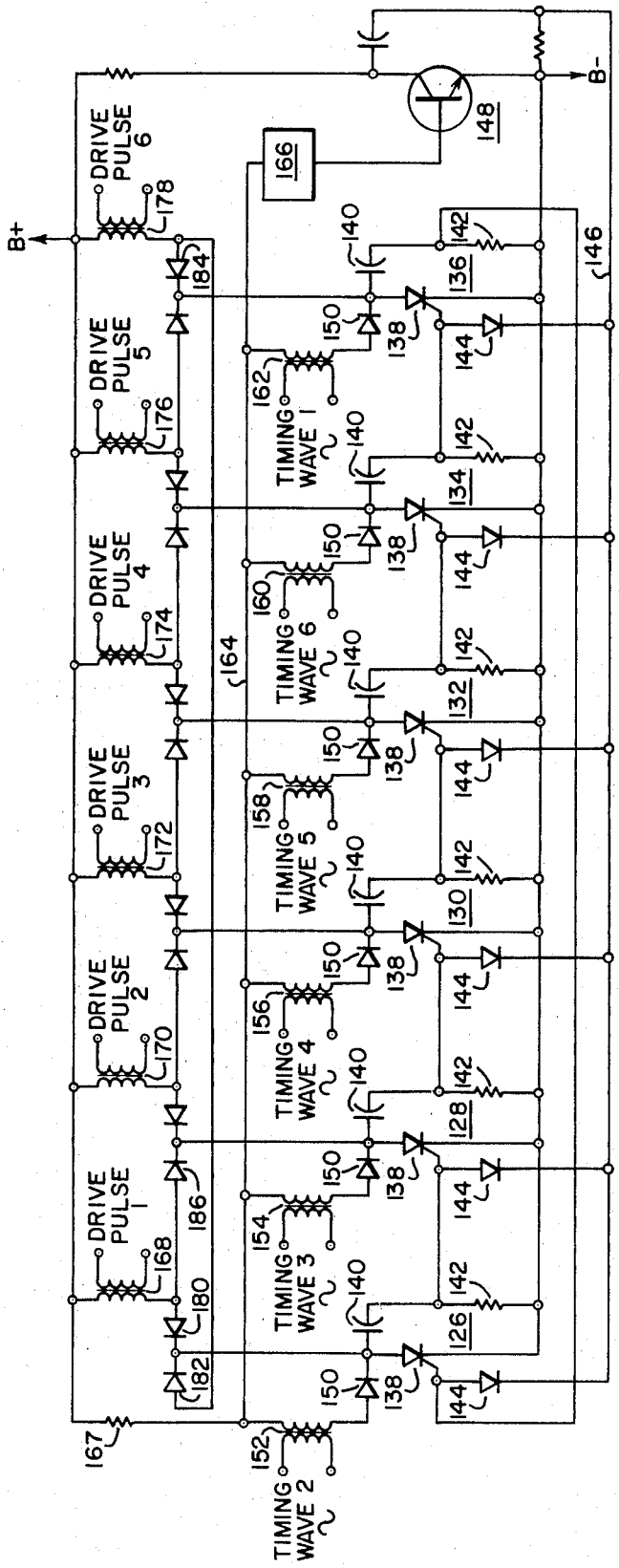
FIG. 4 is a detailed schematic circuit diagram for a six-pulse drive circuit.

An alternative circuit arrangement which can be used to provide a six-pulse output is shown in FIG. 4. In this circuit, only one crossover detector is required for all six pulses, and this results in a further reduction in the required number of switching devices. In this case, the ring counter is provided with six stages 126, 128, 130, 132, 134, and 136. Each stage, such as stage 126 for example, includes a gate controlled switch 138 having its cathode connected to a source of negative voltage identified as B— and its anode connected through capacitor 140 and resistor 142 to the same source of negative voltage. The junction of capacitor 140 and resistor 142 is, in turn, connected to the gate electrode of the gate controlled switch in the next stage 128; and the gate electrodes of all of the gate controlled switches are connected through diodes 144 to a lead 146 connected to the output of a cross-over detector 148 identical in operation to the crossover detector described in connection with FIG. 2.

The anode of each gate controlled switch 138 in an associated stage 126–136 of the ring counter is connected through a diode 150 to an associated timing wave transformer 152, 154, 156, 158, 160 or 162. One terminal of each of the primary windings on the transformers 152–162 is connected through lead 164 to one of the terminals of the control voltage source 166. The other terminal of the source 166 is connected to the base of the transistor in the crossover detector 148. Lead 164 is also connected through resistor 167 to a source of positive voltage, identified as B+, and serves the same purpose as the resistor 104 in FIG. 2. That is, it insures a net forward current flow through diodes 150 when the gate controlled switches in the various stages of the ring counter are ON regardless of the polarity of the timing voltage.

The output pulse transformers for the various drive pulses are identified in FIG. 4 by the numerals 168, 170, 172, 174, 176 and 178. As shown, the anodes of the gate controlled switches in the stages 126–136 of the ring counter are connected through diodes to the primary windings of two output pulse transformers. Thus, the anode of gate controlled switch 138 in stage 126 is connected through diode 180 to the primary winding of output transformer 168 and through diode 182 to the primary winding of output pulse transformer 178. Similar diodes connect the anodes of the gate controlled switches in the various ring counter stages to each of two primary windings of respective pulse transformers.

It will be appreciated that with the circuit of FIG. 4, only one of the six gate controlled switches is ON at a given time and that the conduction period of each switch is 60°. It is for this reason that the output of each stage of the ring counter is connected through diodes to two adjacent output pulse transformers. That is, by connecting the anode of switch 138 in stage 126 to the primary winding of transformer 178, the pulse output from transformer 178 will persist for 60° following the pulse, also of 60°, produced by stage 136 and applied to the transformer through diode 184. Consequently, the total pulse width of the pulse produced across transformer 178 will be 120°. Similarly, after stage 126 is cut off, stage 128 will initiate conduction for a period of 60°; and this 60° period of conduction will be added through diode 186 to the 60° period produced by stage 126 to produce the desired 120° pulse width.

Figure 5A:
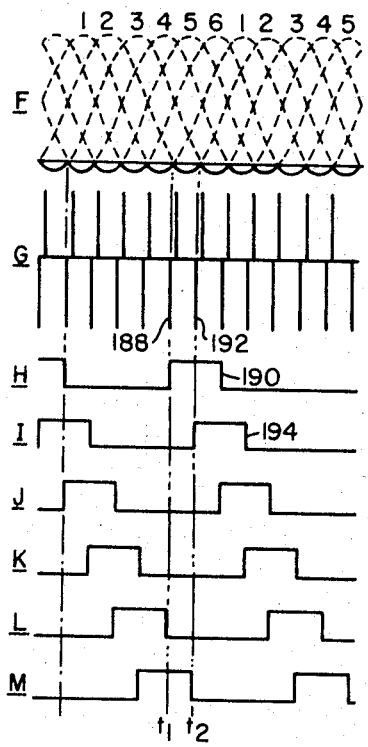
FIGS. 5A, 5B and 5C illustrate waveforms appearing at various points in the circuit of FIG. 4 for various control voltage levels.
Figure 5B:
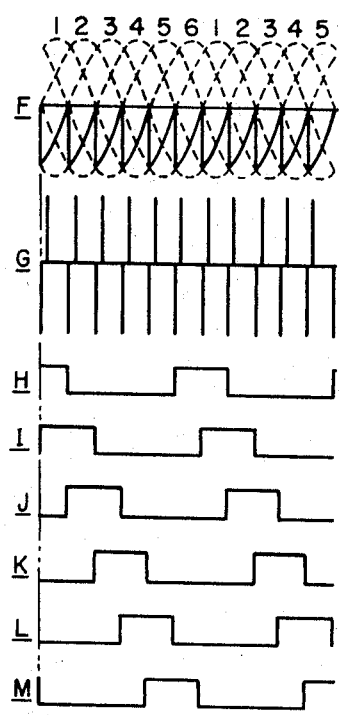
Figure 5C:
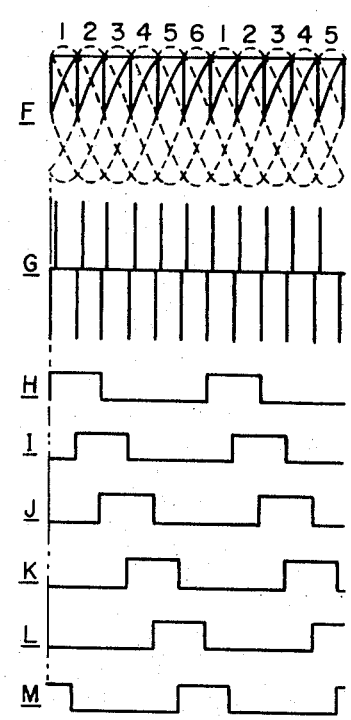

The waveforms produced by the circuit of FIG. 4 are shown in FIGS. 5A, 5B and 5C. Waveform F represents the applied timing waveforms, waveform G represents the clock pulses on lead 146, and waveforms H, I, J, K, L and M represent the drive pulse waveforms produced across transformers 168, 170, 172, 174, 176 and 178, respectively.

At time $t_1$, for example, the timing waveform 1 applied to transformer 162 in stage 136 crosses the control voltage level in the positive-going direction. This produces a clock pulse 188 at the output of crossover detector 148 which switches OFF stage 136 and switches ON stage 126. When stage 126 switches ON, a pulse 190 is initiated across output transformer 168. At time $t_2$, the next timing wave 2 crosses the control voltage level in the positive-going direction whereby a second clock pulse 192 is produced to switch stage 126 OFF while switching stage 128 ON. When stage 128 switches ON, a pulse 194 in waveworm I appears across output transformer 170. However, at the same time, pulse 190 persists since transformer 168 is connected to stage 128 through diode 186. It can be seen, therefore, that waveforms H–M will result in which the pulses are displaced with respect to each other by 60°, but wherein each pulse persists for a period of 120°.

It can be seen, therefore, that the present invention provides an improved phase control drive circuit for controllable electric valves in which only one crossover detector is required, no preset controls are required, and the circuit size and cost are reduced. In this respect, it will be appreciated that the switching elements of the ring counter perform a double function. That is, they sample the firing waveform and they also energize the gate transformers. While the invention has been described herein in connection with a ring counter employing gate controlled switches, it will be readily apparent that other types of ring counters, for example those employing transistors, can be utilized in accordance with the teachings of the invention, a feature of the invention being the utilization of any type of ring counter for the purpose of sampling timing waveforms only during a portion of their cycle.

Although shown, by way of example, in connection with pulse drive for AC-DC converters, the principles of the invention may be employed to generate and supply drive pulses for other purposes. For example, the invention may be employed to supply firing pulses to the valves in other types of converters such as inverters, cyclo-converters, etc., or in any system wherein a plurality of controlled electric valves have to be fired in a cyclic predetermined sequence.

The "states" of a ring counter referred to herein are the "stable states" of the counter. Thus an $n$-state counter has $n$ stable states.

It should be understood that the ring counter plus crossover detector circuitry is an aspect of the invention which has independent utility and may be employed for purposes other than supplying pulses on a plurality of output lines. For example, the clock pulses on lines 28 and 146, in addition to sequencing the counter through its respective states, may also be employed as output pulses to drive other apparatus. It should also be understood that although the examples shown have $n$ timing wave sources whose respective waves are phased 360° $n$ apart, i.e., they are equally spaced, the spacing may be made unequal in order to produce desired differences in spacing between the clock pulses on lines 28 and 146.

It should be understood that the control voltages from source 64 may be constant or they may be variable. The control voltage 64 may be manually adjustable or variable in response to some control signal or condition for example on error signal in a feedback regulating system involving the output of rectifier 10 and a desired voltage reference.

It is to be further understood that the herein described arrangements are simply illustrative of the principles of the invention, and that other embodiments and applications are within the spirit and scope of the invention.

We claim as our invention:

1. In apparatus for generating pulses displaced in phase with respect to each other with the leading edge of each pulse corresponding with the point of intersection of an associated sinusoidal timing wave with a direct current voltage level, the combination of a single crossover detector having applied thereto a direct current control voltage, a plurality of timing wave sources each of which is arranged to be connected to said crossover detector, and ring counter switching means for connecting the timing wave sources to the crossover detector in sequence whereby each timing wave is sampled and fed to the crossover detector alone during the time that it intersects said direct current voltage.

2. The apparatus of claim 1 wherein the ring counter switching means includes a plurality of cascaded stages, an output pulse transformer connected to each of said stagfes, a timing wave transformer connected to each of said stages, and means connecting each of said timing wave transformers to the input of said crossover detector.

3. The apparatus of claim 1 wherein said crossover detector comprises a transistor switch having a differentiator connected across its output, said pulses comprising spiked pulses of one polarity produced by said differentiator.

4. The apparatus of claim 2 wherein each of said ring counter stages includes an electron valve which is ON or OFF, a first diode connecting said electron valve to the output pulse transformer for that stage, and a second diode connecting said electron valve of each stage to the timing wave transformer for that stage.

5. The apparatus of claim 4 wherein said first and second diodes are poled to conduct current in the same direction.

6. The apparatus of claim 4 including biasing means for insuring a net forward current flow through said second diodes when their associated electron valves are ON regardless of the polarity of said timing wave sources.

7. The apparatus of claim 2 wherein there are three timing wave sources and three stages in the ring counter switching means.

8. The apparatus of claim 2 wherein there are six timing wave sources and six stages in said ring counter switching means.

9. The apparatus of claim 8 including a pair of diodes at the output of each stage in the ring counter switching means, one of said diodes connecting the output of a stage to its associated output pulse transformer and the other of said diodes connecting the output of said stage to the output pulse transformer for the preceding stage in the ring counter switching means.

10. Electrical apparatus comprising:
 (a) $n$ number of sources of timing waves having particular polarity going portions recurring at a particular frequency, the waves of the respective sources being phase displaced from each other,
 (b) a detector, which when a wave having said particular polarity going portion is applied thereto, provides a control pulse when the wave while going in said particular polarity direction crosses a control signal, whereby in response to the application of such a control signal and of a succession of such waves, said detector provides a corresponding succession of said control pulses,
 (c) means for applying to said detector a control signal,
 (d) an $n$-state ring counter which in response to said control pulses successively changes states, and
 (e) means responsive to said successive changes of state for successively connecting said timing wave sources one at a time to said detector in a cyclic sequence.

11. The combination as in claim 10 wherein there is means for charging the level of said control signal whereby the phase positions of said control pulses relative to said timing waves are changeable.

12. The combination as in claim 10 wherein said timing waves are voltage waves and said control signal is a control voltage.

13. The combination of claim 10 wherein, said means (e) includes means responsive to each change of state of the counter for disconnecting from said detector one of said wave sources and means responsive to each change of state of the counter for connecting to the detector that wave source whose waves next follow those of said one wave source in point of time.

14. The electrical apparatus as in claim 10 wherein the waves of said respective sources are equally displaced in phase.

15. The electrical apparatus as in claim 10 and further including:
 (f) $n$ output lines, and
 (g) means responsive to said successive changes of state for providing output pulses successively on said output lines in a cyclic sequence.

16. The electrical apparatus as in claim 15 wherein the waves of said respective sources are equally displaced in phase.

17. The combination as in claim 15 which further includes:
 (h) a circuit including $n$ controllable electric valves, and
 (i) means for controlling each valve in response to the output pulses on a different one of said output lines, whereby said valves are rendered conductive in a cyclic successive order.

18. The combination as in claim 15 wherein said means (g) includes means responsive to each change of state of the counter for providing an output pulse on a different one of said output lines.

19. The combination of claim 15 wherein said means (g) includes means responsive to each change of state of the counter for providing output pulses on two of said output lines, the two output lines energized by each change of state including one of the output lines energized by each of the immediately preceding and immediately following changes of state.

References Cited
UNITED STATES PATENTS

| | | | |
|---|---|---|---|
| 2,790,900 | 4/1957 | Feissel | 328—62 XR |
| 3,189,831 | 6/1965 | Bjäresten | 328—63 XR |
| 3,370,178 | 2/1968 | Risberg | 307—223 |

STANLEY D. MILLER, Primary Examiner

J. ZAZWORSKY, Assistant Examiner

U.S. Cl. X.R.

307—223, 261, 269; 328—62, 63, 75